(12) United States Patent
Huss et al.

(10) Patent No.: US 9,998,303 B1
(45) Date of Patent: Jun. 12, 2018

(54) METHOD OF ADAPTIVELY CONTROLLING A LOW FREQUENCY EQUALIZER

(71) Applicant: Cadence Design Systems, Inc., San Jose, CA (US)

(72) Inventors: Scott David Huss, Cary, NC (US); Loren Blair Reiss, Raleigh, NC (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days. days.

(21) Appl. No.: 15/380,474

(22) Filed: Dec. 15, 2016

(51) Int. Cl.
- H03H 7/30 (2006.01)
- H04L 25/03 (2006.01)
- H04B 1/16 (2006.01)

(52) U.S. Cl.
CPC ......... H04L 25/03057 (2013.01); H04B 1/16 (2013.01)

(58) Field of Classification Search
CPC ............................ H04L 25/03057; H04B 1/16
USPC ......................................................... 375/233
See application file for complete search history.

(56) References Cited

U.S. PATENT DOCUMENTS

| | | | | |
|---|---|---|---|---|
| 3,824,501 A * | 7/1974 | Harris | ...................... | H04B 3/06 327/179 |
| 5,440,583 A * | 8/1995 | Koike | ...................... | H04B 3/08 375/233 |
| 5,568,411 A * | 10/1996 | Batruni | ............... | H03H 21/0012 708/322 |
| 6,038,266 A * | 3/2000 | Lee | .................... | H04L 25/03038 375/317 |
| 9,819,520 B1 * | 11/2017 | Huss | .................. | H04L 25/03057 |
| 2010/0329325 A1 * | 12/2010 | Mobin | ............... | H04L 25/03057 375/232 |
| 2013/0287088 A1 * | 10/2013 | Mobin | ...................... | H04L 7/10 375/233 |

OTHER PUBLICATIONS

Parikh et al., "A 32Gb/s Wireline Receiver with a Low-Frequency Equalizer, CTLE and 2-Tap DFE in 28nm CMOS", Feb. 17-21, 2013; 4 pages; ISSCC 2013 / Session 2 / Ultra-High-Speed Transceivers and Equalizers / 2.1; 2013 IEEE International Solid-State Circuits Conference, San Francisco, CA.

* cited by examiner

*Primary Examiner* — Helene Tayong
(74) *Attorney, Agent, or Firm* — Hunton Andrews Kurth LLP

(57) ABSTRACT

A circuit and method for adaptively controlling an equalizer circuit to reduce intersymbol interference at low frequencies relative to a transmit frequency of an input signal from a transmitter. The input signal is converted into a data signal by a receiver. At least one delayed data signal is formed by delaying the data signal by at least one unit interval (UI) beyond a length of a decision feedback equalizer (DFE) in the receiver. An error signal is formed by comparing the input signal to a threshold value. An error signal sample is correlated with at least one delayed data signal sample to determine whether to adjust a control coefficient of the equalizer. Thus the equalizer is controlled as if the DFE had at least one additional tap.

20 Claims, 7 Drawing Sheets

METHOD OF ADAPTIVELY CONTROLLING A LOW FREQUENCY EQUALIZER

FIELD OF THE INVENTION

The present invention relates to reduction of intersymbol interference through adaptive control of an equalizer.

BACKGROUND

Intersymbol interference (ISI) is a serious problem in digital communications systems. Various ways have been developed to reduce ISI at both the transmitter end and the receiver end of a communications system. Existing methods attempt to equalize transmitted data signals, with the objectives of correcting for the effects of channel attenuation and complete cancellation of ISI. A conventional serial receiver consists of an analog front end that generally includes a continuous time linear equalizer (CTLE), a sampler that quantizes the analog input into digital values, a decision feedback equalizer (DFE) that uses the quantized data to adaptively feedback a correction signal to the input of the receiver, and a timing recovery unit.

In many communication channels, ISI occurs at frequencies that are significantly lower than the data rate. The presence of ISI at low frequencies can be attributed to skin effect loss in communication channels that connect the transmitter to the receiver. The skin effect causes channel attenuation to be more proportional to the square root of frequency rather than being linear with frequency. Conventional components in serial links such as a transmitter equalizer, CTLE, and DFE typically only compensate for ISI at frequencies down to around one-fifth the data rate, and therefore leave significant amounts of residual ISI.

DETAILED DESCRIPTION

The present disclosure provides non-limiting representative examples referencing numerals to particularly describe features and teachings of different aspects of the invention. The described embodiments should be recognized as capable of implementation separately or in combination with each other. A person of ordinary skill in the art reviewing the present disclosure should be able to learn and understand the different described aspects of the invention. The described embodiments should facilitate understanding of the invention to such an extent that other implementations not specifically covered, but within the knowledge of a person of ordinary skill in the art having read the present disclosure, would be understood to be consistent with an application of the invention.

Embodiments of the present disclosure relate to a low frequency equalizer (LFEQ) and a method of controlling the LFEQ. The LFEQ may be located in a receiver device that processes an input signal from a transmitter. Alternatively, the LFEQ may be located in the transmitter. Placing the LFEQ in the receiver is preferable because the length of a feed forward equalizer (FFE) in the transmitter may need to be increased in order for an LFEQ in the transmitter to be effective. In one specific embodiment, the LFEQ is located between a sampler and a DFE in the receiver. However, the LFEQ can be located anywhere in the receive chain between the output pins of the receiver and the sampler. The LFEQ can also be integrated into the DFE.

Figure 1:
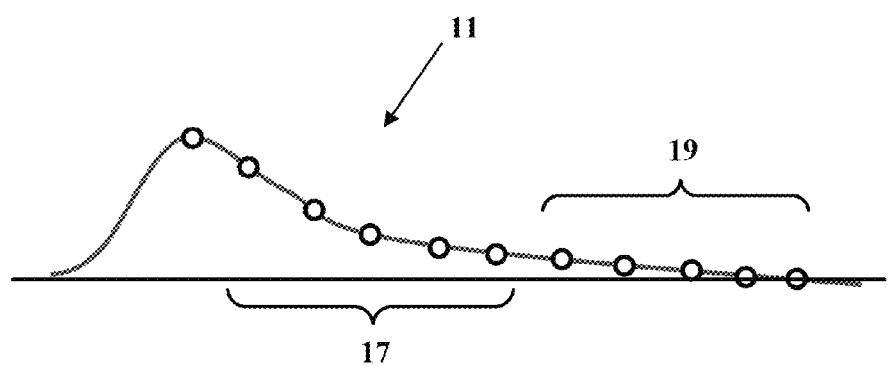
FIG. 1 shows a hypothetical impulse response signal affected by low frequency ISI.

FIG. 1 shows a hypothetical impulse response signal 11 for an input to a receiver as a function of time. Data signals can be voltage or current signals, but for discussion purposes, assume that data are transmitted using voltages. Each circle corresponds to a data sample of the signal 11. The signal 11 is affected by low frequency ISI, which manifests itself in long settling times. The main cursor of the signal 11 has a duration of 1 unit interval (UI) and carries the data for the signal (in this case a logical 1 value). The main cursor has a fairly well defined peak, possibly because of equalization performed by the transmitter or by an earlier equalization stage in the receiver. However, low frequency ISI has resulted in significant amounts of post-cursor error (the portion of the signal to the right of the main cursor) so that the pulse extends out for many UIs before settling back to zero volts.

A typical DFE in a receiver has a fixed length, corresponding to N number of adjustable taps that are positioned throughout the impulse response of the DFE to provide equalization at relatively high frequencies. Similarly, a typical CTLE is designed with a peak response at or near the Nyquist frequency, but provides little low frequency equalization. For example, the DFE may only have N=5 taps spaced apart by one UI so that the tap positions correspond to the data samples in the region 17 of FIG. 1. The present disclosure proposes to supplement the equalization performed by a DFE, by introducing an LFEQ that is controlled as if the DFE had at least one additional tap—even though the DFE may not actually have any additional taps. The inventors initially experimented with an LFEQ controlled based on a single tap position N+1. The LFEQ was adaptively controlled by measuring the correlation of an error at the current sample with a data sample from N+1 UIs earlier. The correlation was performed using a Least Means Square (LMS) algorithm. The inventors discovered that using only a single data sample so far back in time often resulted in incorrect adaptation due to signal reflections along the communication channel between the receiver and the transmitter. The inventors then improved on the initial design by controlling the LFEQ based on additional data samples that would be obtained if the DFE had even more taps, e.g., if the DFE spanned N=6 to 10, corresponding to region 19 of FIG. 1. To utilize the data contained in region 19, pattern detection logic was added to look for five consecutive identical data bits (all 0's or all 1's) prior to a current data sample. Consequently, the correlation algorithm was much less sensitive to reflections in the channel. Details of the LFEQ design and control logic for adaptively controlling the LFEQ, including the pattern detection logic and alternative control logic, will be described.

Figure 2:
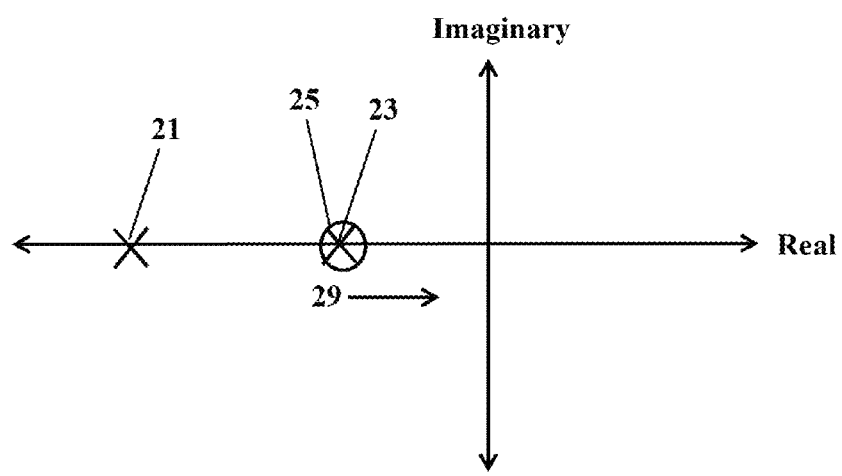
FIG. 2 is a pole zero diagram for a low frequency equalizer according to an embodiment of the present disclosure.

FIG. 2 is a pole zero diagram for an LFEQ according to an embodiment of the present disclosure. The horizontal axis is the real component; the vertical axis is the imaginary component. The LFEQ essentially implements a band-pass filter with two fixed poles at 21 and 23 located, for example, at 9 GHz and 225 MHz, respectively. The LFEQ also has an adjustable zero 25, which can be adjusted via the LFEQ control in the direction of arrow 29 to provide increasing amounts equalization. Specifically, the zero frequency is reduced as the equalization is increased. This zero can be controlled by adjusting a resistor or capacitor in an analog circuit. The adjusting may be proportional to or based on a value of an LFEQ control coefficient.

Figure 3:
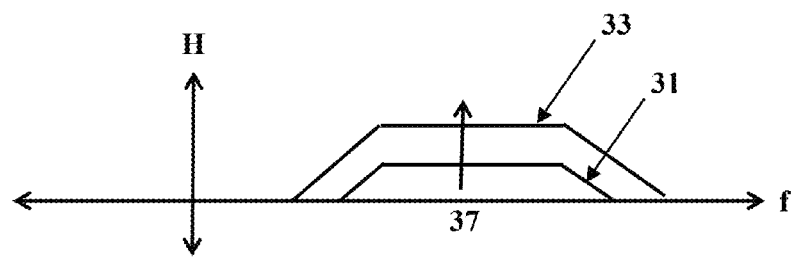
FIG. 3 is a transfer function diagram for a low frequency equalizer according to an embodiment of the present disclosure.

FIG. 3 is a transfer function diagram for the LFEQ of FIG. 2. The transfer function H is plotted as a function of frequency. The magnitude of the LFEQ response increases in the direction of arrow 37 in correspondence with increasing amounts of equalization. For example, the transfer function 31 provides less equalization than the transfer function 33.

Figure 4:
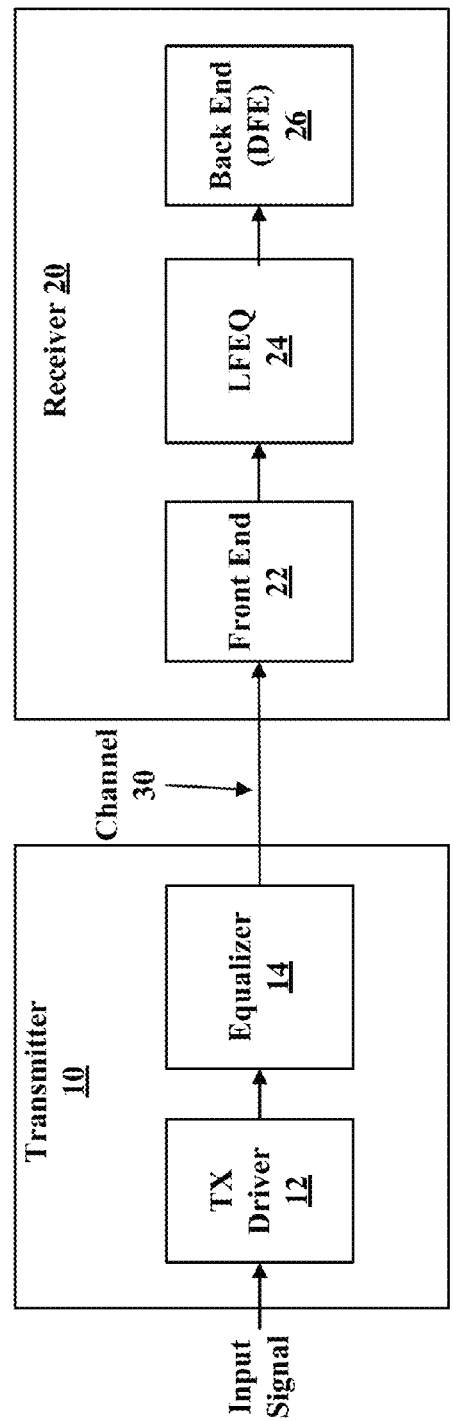
FIG. 4 is a block diagram of a communication system according to an embodiment of the present disclosure.

FIG. 4 is a block diagram of a communication system 100 according to an embodiment of the present disclosure. The system 100 includes a transmitter 10, a receiver 20, and at least one channel 30 connecting the transmitter to the receiver. The channel 30 may be unidirectional or bidirectional. Each channel may transmit data differentially using a positive polarity data signal and a negative polarity data signal. However, a single-ended implementation is also possible.

The transmitter 10 receives an input signal to be transmitted and transmits a representation of the input signal using a transmission (TX) driver 12. The system 100 may be a serial communication system, in which case the input signal may be serialized before or after being input to the transmitter. The TX driver 12 may form a differential signal based on the input signal. The differential signal has a specified amplitude, the value of which may vary depending on the communication standard by which the transmitter communicates with the receiver.

The transmitter 10 may include an equalizer 14 which could be implemented, for example, using an FFE. Shown separately in FIG. 4, the equalizer 14 and the TX driver 12 can be combined into a single circuit block.

The input to the receiver 20 is processed through a front end 22, which may include an AC coupling network, a sampler, and a deserializer. The front end 22 may include other signal conditioning elements, such as a CTLE that provides some equalization of the input. The front end 22 passes the processed input to an LFEQ 24, which analyzes the input to adjust the LFEQ based on a control signal determined by control logic. The LFEQ control logic may be part of the same circuit block that forms the LFEQ or a separate circuit.

The receiver 20 may include a back end 26 that performs additional signal conditioning, for example using a DFE to correct the post-cursor of the input signal. The back end 26 may also include other conventional receiver components, such as a timing recovery unit that corrects the timing of the sampler and/or the deserializer.

Figure 5:
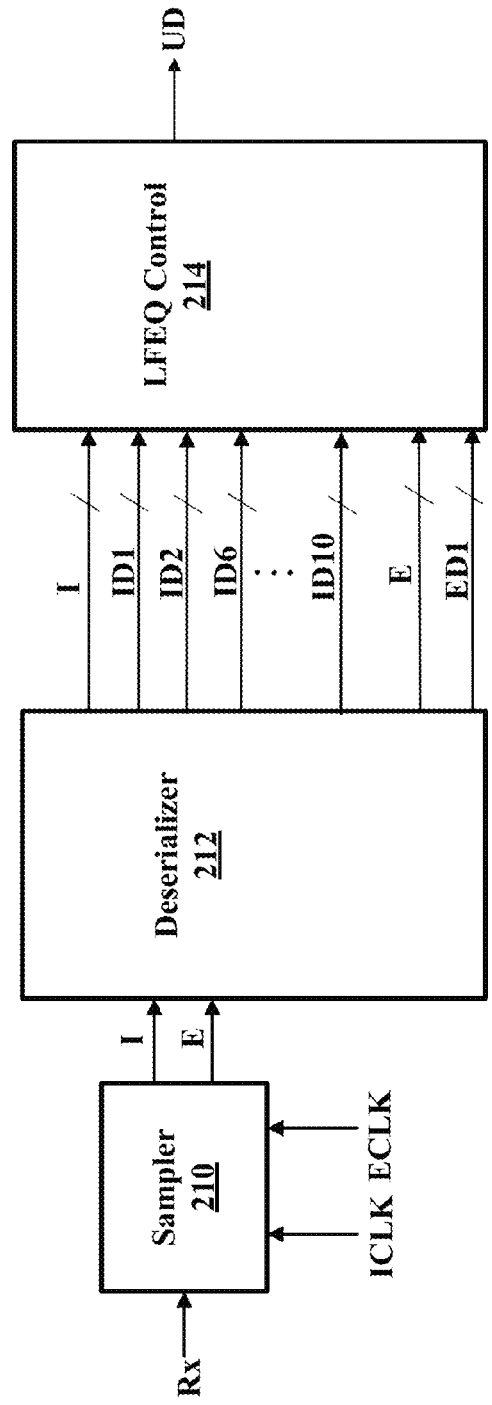
FIG. 5 is a block diagram of a partial receiver according to an embodiment of the present disclosure.

FIG. 5 is a block diagram of a partial receiver 200 according to an embodiment of the present disclosure. FIG. 5 illustrates details of the front end and the LFEQ control logic. The partial receiver 200 may include a sampler 210, a deserializer 212, and a pre-cursor control unit 214. The sampler 210 converts the received input Rx into digital 1's and 0's to form a stream of digital pulses. The sampler 210 may include analog-to-digital conversion elements such as comparators, voltage reference generators, memory latches, shift registers, etc. The output of the sampler 210 may include a first digital signal I representing the input data and a second digital signal E that is an error signal representing the difference between the input and an expected input (e.g., the positive error threshold in FIG. 6). The E signal may be a binary signal in which a value of 1 indicates that the input Rx is above a threshold (positive error) or below the threshold (negative error). The I and E signals are generated based on samples of the input Rx. The samples for the data signal I are taken at time intervals controlled by a data clock ICLK. Similarly, the samples for the error signal E are taken at time intervals controlled by an error clock ECLK. The ICLK and ECLK signals are in phase with each other, and thus the resulting I and E signals are also in phase.

The deserializer 212 processes the I and E signals to form a set of deserialized (parallel) inputs to the LFEQ control logic 214. The parallel inputs include, in addition to the I signal, delayed versions of the I and E signals. ID1 and ID2 correspond to the I signal delayed by one UI and two UIs, respectively. Similarly, ID6 to ID correspond to I delayed by six to ten UIs, and ED1 corresponds to the E signal delayed by one UI. Assuming the DFE has five taps, ID6 to ID10 correspond to the signal I being delayed by 1 to 5 UIs beyond the length of the DFE.

The LFEQ control logic 214 processes the I, ID1, ID2, ID6 to ID10, E, and ED1 signals to produce a signed binary control signal UD that controls the LFEQ. The value of UD (+1, −1 or 0) indicates whether the LFEQ should be adjusted up or down or left unchanged. The UD signal is periodically updated with new input to adaptively control the LFEQ.

Figure 6:
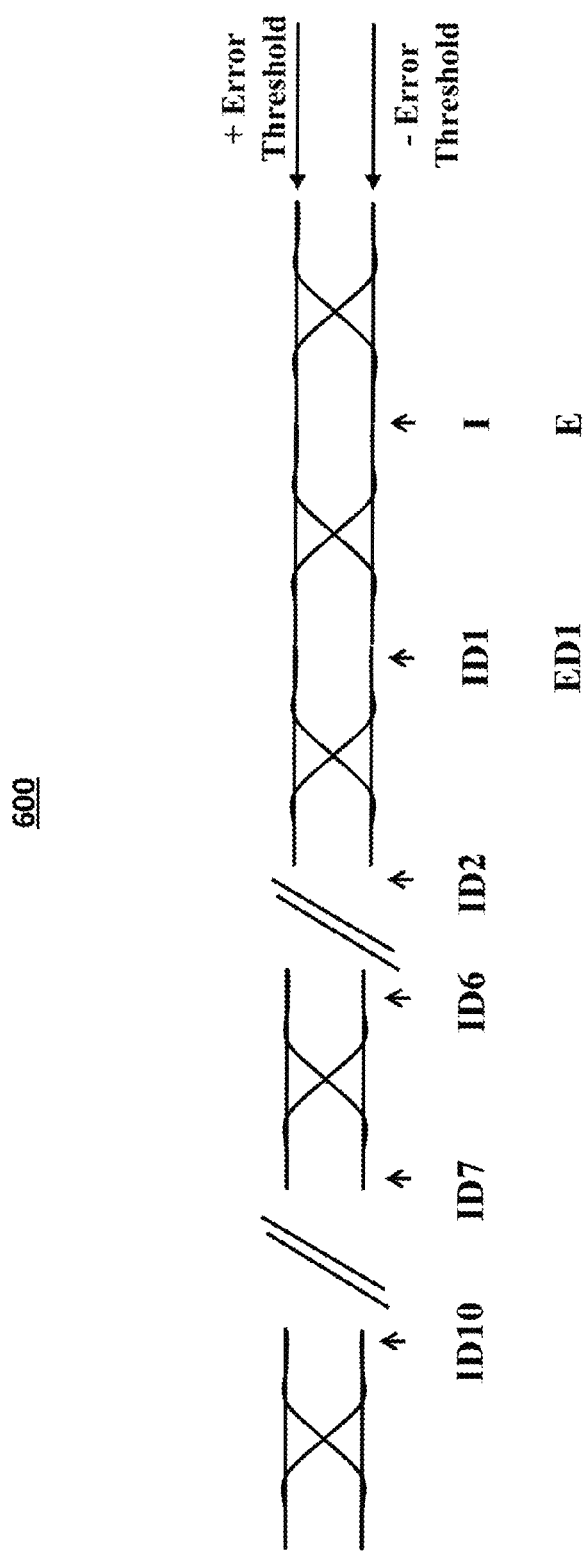
FIG. 6 is a composite timing diagram showing the relative timing of signals formed for use by a low frequency equalizer according to an embodiment of the present disclosure.

FIG. 6 is a composite timing diagram 600 showing the relative timing of signals formed by the deserializer. The sampler input signal (e.g., Rx in FIG. 5) may be compared to one or more error thresholds to determine the error E for the data signal. The error thresholds may, for example, include a positive error threshold associated with a logical 1 value, and a negative error threshold associated with a logical 0 value. An example embodiment will be described in which only the positive error threshold is used.

Figure 7:
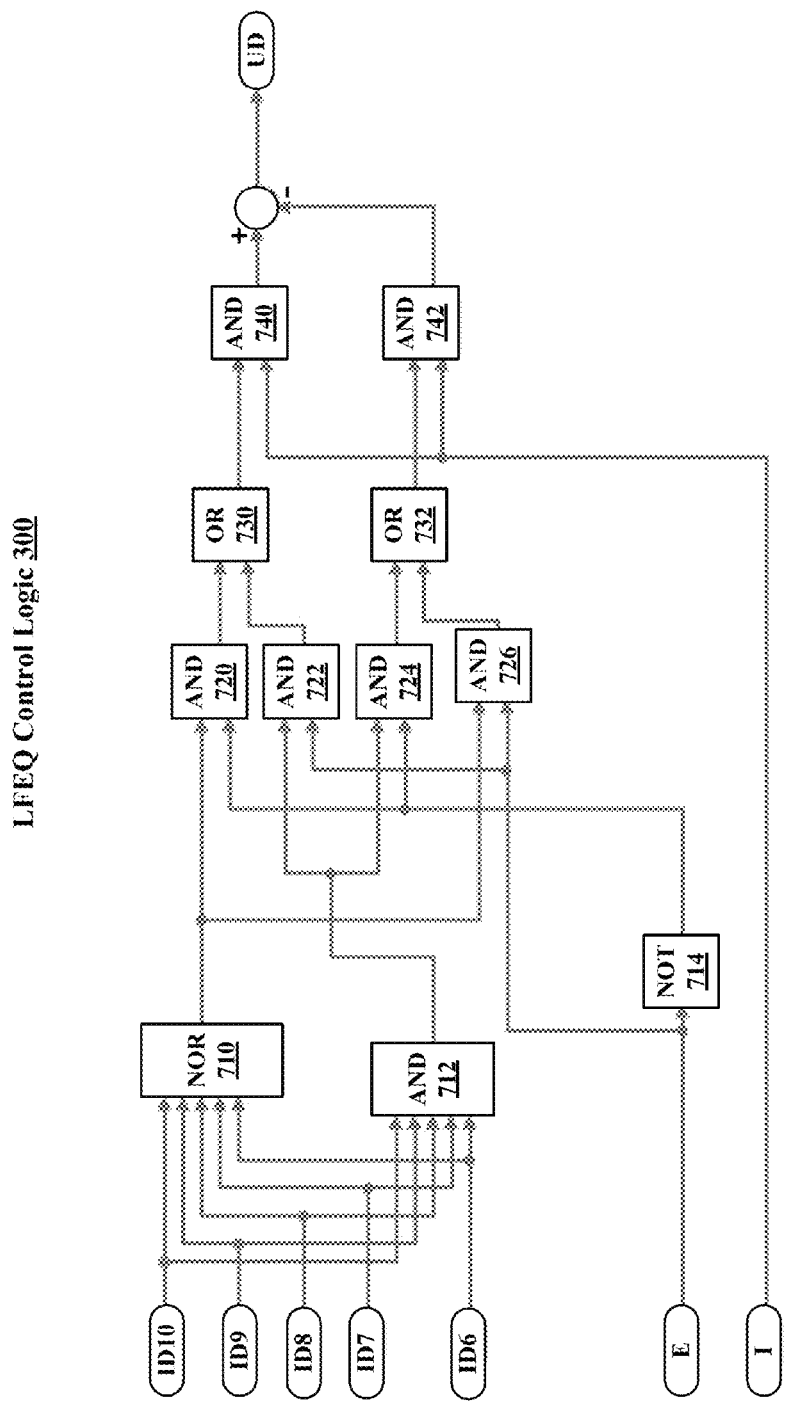
FIG. 7 illustrates low frequency equalizer control logic according to an embodiment of the present disclosure.

FIG. 7 illustrates LFEQ control logic 300 according to an embodiment of the present disclosure. The control logic implements an LMS algorithm for the LFEQ, although other correlation algorithms may be used as an alternative. Example embodiments use a sign LMS algorithm that correlates the sign of the error at the present symbol with earlier data symbols from 6 to 10 UIs prior. The basic LMS algorithm for tap 1 of a DFE is:

increment=~($E$^$Id1$)&$I$ decrement=($E$^$Id1$)&$I$ where ^denotes the XOR operation, & denotes the logical AND operation, | denotes the logical OR operation, and ~ denotes the NOT operation. The increment and decrement signals represent a plurality of N updates where N is the deserialization factor. The update period of the increment/decrement is T*N where T is the duration of one unit interval. Thus the expressions in the increment and decrement formulas may be applied to each update and the results summed together to form the respective increment or decrement signal. The LMS algorithm can be modified to control an LFEQ according to the present disclosure as follows:

$$\text{increment} = (\sim E \& \sim (Id6|Id7 \ldots |Id10)|E \& (Id6 \& Id7 \ldots \& Id10)) \& I$$

$$\text{decrement} = (E \& \sim (Id6|Id7 \ldots |Id10)|\sim E \& (Id6 \& Id7 \ldots \& Id10)) \& I$$

The control logic 300 implements the modified LMS algorithm above using a NOR gate 710, a set of AND gates 712, 720, 722, 724, 726, 740 and 742, a NOT gate 714, and OR gates 730 and 732. The delayed data signals ID6 to ID10 are each input to NOR 710 and AND 712. The gates 710 and 712 form pattern matching logic. NOR 710 outputs a 1 if ID6 to ID10 are all 0. AND 712 outputs a 1 if ID6 to ID10 are all 1. Thus, the gates 710 and 712 look for a pattern of five consecutive identical data bits (CIDs) before the control logic 300 is permitted to evaluate the error signal E and make a decision as to whether to adjust the LFEQ. This averages the ISI across several data samples by summing the error in the impulse response from taps 6 to 10, and makes the LMS algorithm less sensitive to channel reflections.

NOT gate 714 inverts the polarity of the E signal. AND gate 720 receives the output of NOR 710 and NOT 714. AND gate 722 receives the output of AND 712 and the E signal. The results from AND 720 and AND 722 are provided to OR gate 730. AND gate 740 receives the output of OR 730 and the I signal. The output of AND 740 corresponds to the value computed by the increment formula described above for the modified LMS algorithm.

AND gate 724 receives the output of AND 712 and NOT 714. AND gate 726 receives the output of NOR 710 and the E signal. The results from AND 724 and AND 726 are provided to OR gate 732. AND gate 742 receives the output of OR 732 and the I signal. The output of AND 742 corresponds to the value computed by the decrement formula described above for the modified LMS algorithm. The output of AND 742 is subtracted from the output of AND 740 to form a control signal UD. A UD value of +1 indicates that the LFEQ should be adjusted up, while a UD value of −1 indicates that the LFEQ should be adjusted down, and a UD value of 0 indicates that no change is needed.

In an alternative embodiment, the control logic may be less strict in enforcing the CID rule, permitting some variation in the data pattern. For example, an alternative rule set may be that (i) bits N+1 to N+3 must be identical, and (ii) bits N+4 to N+7 must have three of the four bits being identical to the polarity (1 or 0) of bits N+1 to N+3. This rule set is more complex to implement, but permits the use of certain run length limited patterns that violate the CID rule, including certain patterns encoded in an 8b/10b format. Thus, an alternative rule or set of rules may allow many more data patterns while still being insensitive to reflections.

Figure 8:
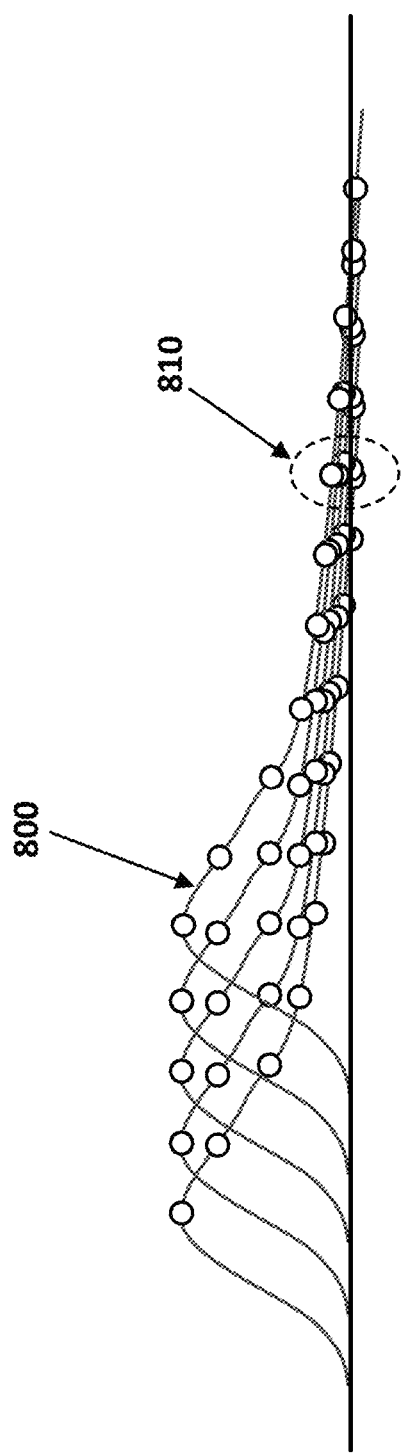
FIG. 8 illustrates an impulse response signal that is delayed repeatedly to form inputs to a low frequency equalizer control logic according to an embodiment of the present disclosure.

FIG. 8 illustrates an impulse response signal 800 that is delayed repeatedly to form inputs to an LFEQ control logic according to an embodiment of the present disclosure. FIG. 8 shows the impulse response of five consecutive 1's that are time shifted and overlaid. The error correlated by the earlier described LMS algorithm is the sum of the errors associated with the data samples labeled 810.

Figure 9:
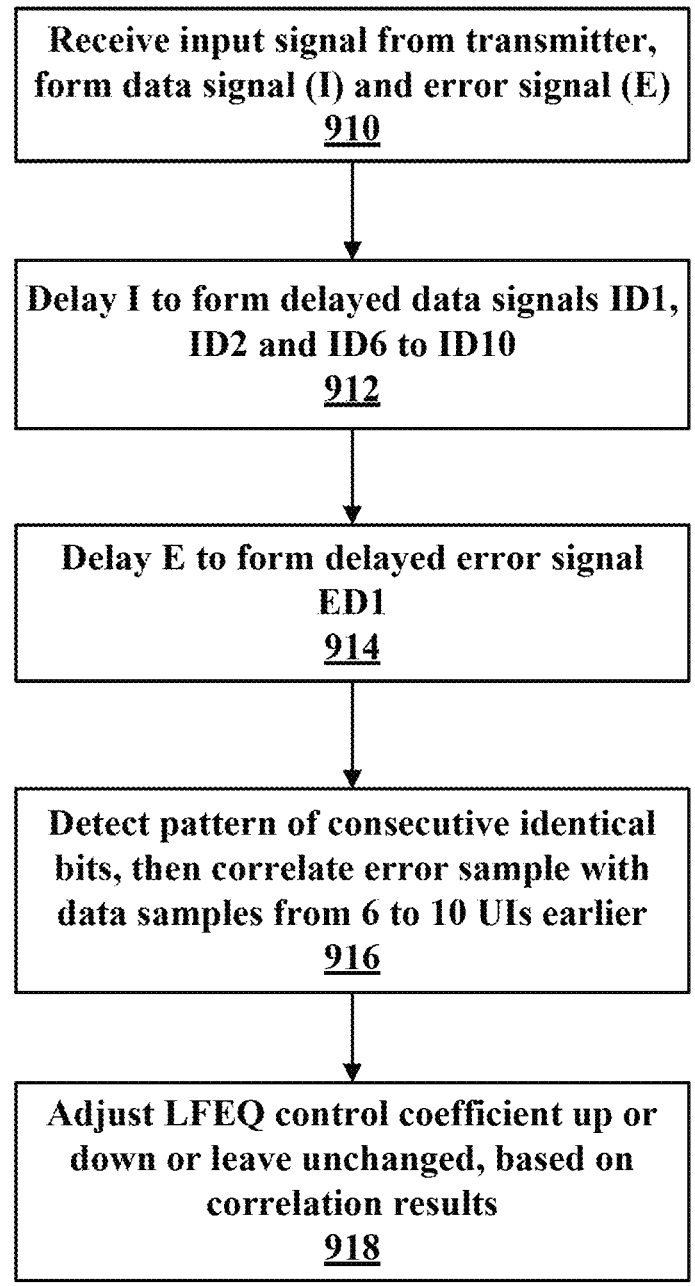
FIG. 9 is a flowchart of a method for controlling a low frequency equalizer according to an embodiment of the present disclosure.

FIG. 9 is a flowchart of a method 900 for controlling a low frequency equalizer according to an embodiment of the present disclosure. The method may be performed by a receiver according to an earlier described embodiment. In step 910, the receiver receives an analog input signal from the transmitter. The input signal may be AC coupled via the front end of the receiver into a sampler. The sampler converts the input signal into a data signal I and forms an error signal E by comparing the input signal to an expected value, e.g., to a positive error threshold voltage.

In step 912, the data signal I is delayed to form delayed signals ID1 and ID6 to ID10.

In step 914, the error signal E is delayed to form delayed signal ED1. The delayed signals ID1, ID2, ID6 to ID10 and ED1 may be formed by a deserializer that provides the delayed signals as parallel inputs to the LFEQ control logic.

In step 916, the LFEQ control logic unit detects a pattern of five CIDs by comparing the delayed data signals ID6 to ID10, then forms a control signal by correlating the present error sample with the data samples from 6 to 10 UIs earlier, using the data signals I, the error signal E, the delayed data signals ID6 to ID10, and the delayed error signal ED1. The correlation can be performed using a sign LMS algorithm that correlates the sign of the error sample to the data samples.

In step 918, the LFEQ control logic outputs a control signal to a controller in the LFEQ to indicate the result of the correlation, causing the LFEQ control coefficient to be adjusted up or down, or left unchanged, depending on the value of control signal.

The description of the foregoing embodiments may refer to algorithms, sequences, and operations that require processor execution of program instructions stored in memory. Memory may include a computer readable storage medium, which is not limited to, but may include, any type of disk, including floppy disks, optical disks, CD-ROMs, magnetic-optical disks, and other memory such as read-only memory (ROMs), random access memory (RAMs), electrically erasable programmable read-only memory (EEPROM), flash memory, magnetic or optical cards, or any other type of media capable of storing program instructions.

In the foregoing description, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for adaptively controlling an equalizer circuit to reduce intersymbol interference at low frequencies relative to a transmit frequency of an input signal from a transmitter, the method comprising:
   converting the input signal into a data signal by a receiver device, wherein the data signal includes data symbols transmitted in successive unit intervals (UIs);
   forming an error signal by comparing the input signal to a threshold value;

forming at least one delayed data signal by delaying the data signal at least one UI beyond a length of a decision feedback equalizer (DFE) in the receiver;

detecting a pattern of consecutive identical bits in the data signal by comparing samples of the at least one delayed data signal; and determining, based on the detecting, whether to adjust a control coefficient of the equalizer circuit, wherein the determining includes correlating an error signal sample with at least one delayed data signal sample.

2. The method of claim 1, further comprising:

forming a control signal that indicates whether the control coefficient is to be adjusted up or down or left unchanged.

3. The method of claim 1, wherein the correlating is performed with a Least Means Square (LMS) algorithm that uses a sign of the error signal sample.

4. The method of claim 3, wherein the error signal is a binary signal that indicates whether a value of the input signal is above or below the threshold value.

5. The method of claim 1, wherein the at least one delayed data signal is formed by a deserializer that outputs the data signal, the at least one delayed data signal, and the error signal in parallel to control logic that performs the determining of whether to adjust the control coefficient.

6. The method of claim 1, wherein the data signal is delayed by multiple UIs beyond the length of the DFE, and wherein a separate delayed data signal is formed for each UI of delay.

7. The method of claim 6, wherein the determination is performed only if the samples of the delayed data signals are all identical.

8. The method of claim 6, wherein the data signal is delayed by at least five UIs beyond the length of the DFE.

9. The method of claim 1, wherein the equalizer circuit has a pair of fixed poles and a zero that is adjusted based on the control coefficient.

10. The method of claim 1, further comprising:

after equalizing the data signal by the equalizer circuit, outputting the equalized data signal to the DFE for further processing.

11. A receiver device for reducing intersymbol interference at low frequencies relative to a transmit frequency of an input signal from a transmitter, the receiver device comprising:

a first circuit arrangement configured to convert the input signal into a data signal that includes data symbols transmitted in successive unit intervals (UIs);

a second circuit arrangement configured to form an error signal by comparing the input signal to a threshold value;

a decision feedback equalizer (DFE);

a third circuit arrangement configured to form at least one delayed data signal by delaying the data signal at least one UI beyond a length of the DFE;

an equalizer circuit configured to equalize the data signal based on a control coefficient; and control logic configured to (i) detect a pattern of consecutive identical bits in the data signal by comparing samples of the at least one delayed data signal and (ii) determine, based on the detecting, whether to adjust the control coefficient, wherein the determining includes correlating an error signal sample with at least one delayed data signal sample.

12. The receiver device of claim 11, wherein the control logic forms a control signal that indicates whether the control coefficient is to be adjusted up or down or left unchanged.

13. The receiver device of claim 11, wherein the correlating is performed with a Least Means Square (LMS) algorithm that uses a sign of the error signal sample.

14. The receiver device of claim 13, wherein the error signal is a binary signal that indicates whether a value of the input signal is above or below the threshold value.

15. The receiver device of claim 11, wherein the third circuit arrangement is a deserializer configured to output the data signal, the at least one delayed data signal, and the error signal in parallel to the control logic.

16. The receiver device of claim 11, wherein:

the third circuit arrangement is configured to delay the data signal by multiple UIs beyond the length of the DFE, forming a separate delayed data signal for each UI of delay.

17. The receiver device of claim 16, wherein the determination is performed only if the samples of the delayed data signals are all identical.

18. The receiver device of claim 16, wherein the third circuit arrangement is configured to delay the data signal by at least five UIs beyond the length of the DFE.

19. The receiver device of claim 11, wherein the equalizer circuit has a pair of fixed poles and a zero that is adjusted based on the control coefficient.

20. The receiver device of claim 11, wherein after equalizing the data signal, the equalizer circuit outputs the equalized data signal to the DFE for further processing.

* * * * *